(No Model.)

N. WASHBURN.
CAR WHEEL.

No. 279,466. Patented June 12, 1883.

Witnesses.
S. N. Piper
E. B. Pratt

Inventor.
Nathan Washburn
by R. H. Eddy att'y.

UNITED STATES PATENT OFFICE.

NATHAN WASHBURN, OF ALLSTON, MASSACHUSETTS.

CAR-WHEEL.

SPECIFICATION forming part of Letters Patent No. 279,466, dated June 12, 1883.

Application filed April 23, 1883. (No model.)

*To all whom it may concern:*

Be it known that I, NATHAN WASHBURN, of Allston, in the county of Suffolk, of the Commonwealth of Massachusetts, have invented a new and useful Improvement in Railway-Car Wheels; and I do hereby declare the same to be described in the following specification and represented in the accompanying drawings, of which—

Figure 1:
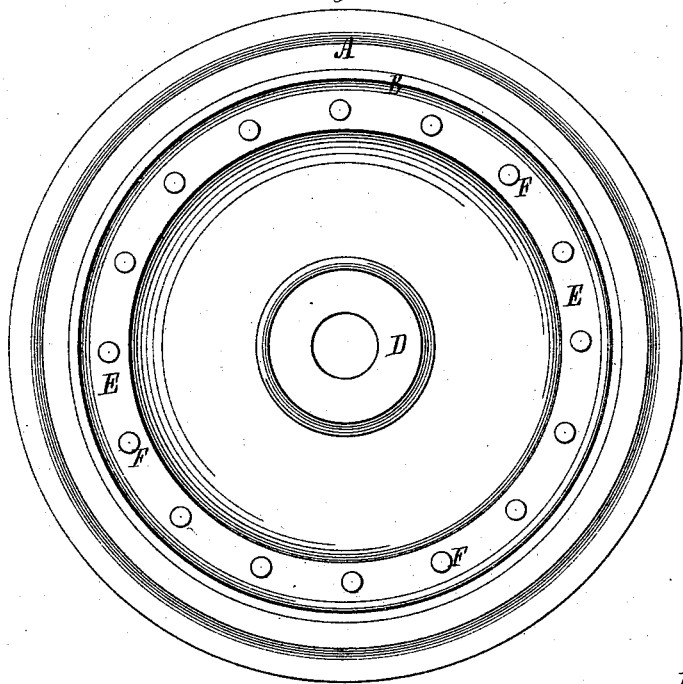
Figure 2:
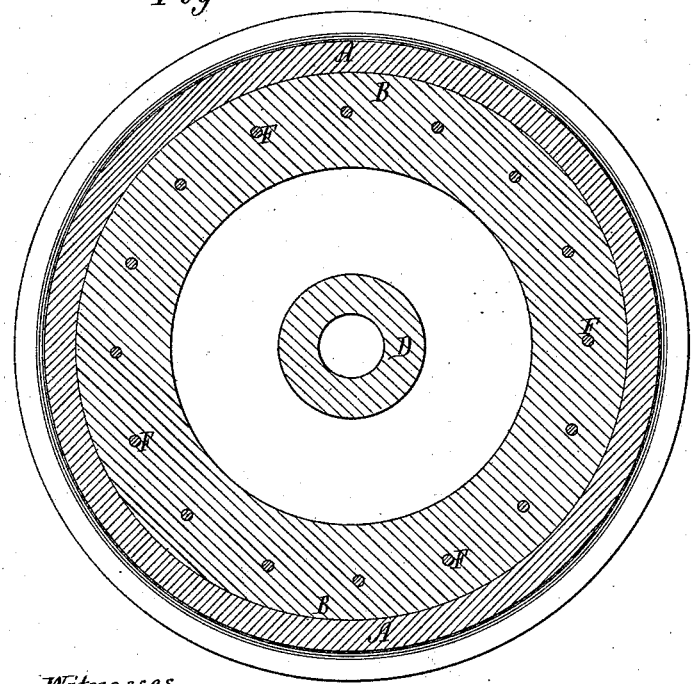
Figure 3:
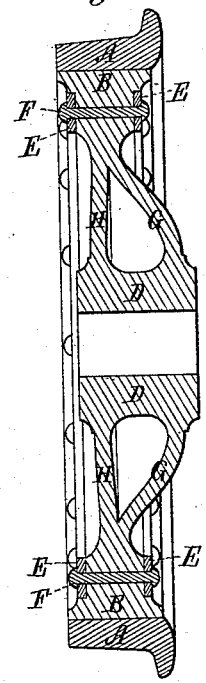

Figure 1 is a side elevation, Fig. 2 a longitudinal section, and Fig. 3 a transverse section, of a car-wheel embodying my invention, the nature of which is defined in the claim hereinafter presented.

The improvement relates to the kind of wheel described and represented in the United States Patent No. 258,266, granted to me on May 23, 1882.

In my present wheel I have, in the place of the wrought-iron spokes of the patented wheel, metal plates cast in one piece with the hub and the rim and extending around the said hub, and I also have the two metallic rings and their connecting-bolts arranged in the rim, as represented. The wheel has a steel tire, A, a rim, B, and two annular plates, G and H, all being of cast-iron founded in one solid piece, the plates G and H extending around the hub, and from thence to the rim, besides which, the wheel has arranged within the rim, and on opposite sides thereof, two wrought-iron or steel flat rings, E, connected by a series of bolts, F, extending from one to the other of the said rings and going through the rim laterally thereof, all being substantially as represented. In making the said wheel the tire, in a sufficiently-heated state, and the rings and their connecting-bolts duly arranged, are placed within the mold for founding the rim, the hub, and the connecting-plates, after which the metal to compose the rim, plates, and hub is to be run into the mold, and to flow against the tire, and between and against the rings, and between and against their connecting-bolts, in which case the rings and bolts will be within the rim, in manner as shown in Figs. 2 and 3, and the plates G and H will connect the rim and hub, and be strengthened or re-enforced by the rings and the bolts.

With my present improvement I avoid the necessity of extending wrought-iron spokes into the rim and the hub, and the consequent weakening of such rim and hub thereby, the rings and their connections operating not only to strengthen the wheel at its rim, but in the connections of the rim and hub, as the said rings and their bolts hold the plates in a manner to prevent them from being cracked, and, besides, the connecting-plates render the wheel stronger, as they cannot spring laterally in the plane of the wheel, as spokes are liable to when the wheel is in use, and in so doing weaken the the wheel.

I do not herein claim a car-wheel having wrought-iron spokes and constructed in other respects as described in the said Patent No. 258,266; but

I claim—

As an improved manufacture, the car-wheel, substantially as hereinbefore described, composed not only of the tire A, wrought-iron rings E E, and connecting-bolts F, but of the hub D, annular plates G and H, and the rim B, arranged as shown, and cast in one piece against the tire and upon the rings and their connecting-bolts, all as set forth.

NATHAN WASHBURN.

Witnesses:
R. H. EDDY,
E. B. PRATT.